(12) United States Patent
Lee et al.

(10) Patent No.: US 8,459,139 B2
(45) Date of Patent: Jun. 11, 2013

(54) ROBOT JOINT DRIVING APPARATUS AND ROBOT HAVING THE SAME

(75) Inventors: Youn Baek Lee, Suwon-si (KR); Hyun Sik Sim, Seongnam-si (KR); Soo Sang Yang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 443 days.

(21) Appl. No.: 12/654,300

(22) Filed: Dec. 16, 2009

(65) Prior Publication Data
US 2010/0162846 A1 Jul. 1, 2010

(30) Foreign Application Priority Data
Dec. 29, 2008 (KR) .......................... 10-2008-135457

(51) Int. Cl.
| | |
|---|---|
| *B25J 17/00* | (2006.01) |
| *B25J 17/02* | (2006.01) |
| *B25J 18/00* | (2006.01) |
| *F16H 27/02* | (2006.01) |
| *F16H 29/02* | (2006.01) |
| *F16H 29/20* | (2006.01) |

(52) U.S. Cl.
USPC ........................................ 74/490.05; 74/89.2

(58) Field of Classification Search
USPC ............ 74/89.2, 89.22, 89.23, 89.34, 490.02, 74/490.01, 490.05
See application file for complete search history.

(56) References Cited

U.S. PATENT DOCUMENTS

| 4,697,472 | A  | * | 10/1987 | Hiyane | ...................... | 74/490.02 |
|---|---|---|---|---|---|---|
| 7,574,939 | B2 | * | 8/2009 | Garrec | ........................ | 74/490.03 |
| 2006/0191362 | A1 | * | 8/2006 | Garrec | ........................ | 74/89.34 |
| 2007/0295126 | A1 | * | 12/2007 | Wang | ........................... | 74/89.35 |
| 2010/0170357 | A1 | * | 7/2010 | Kim et al. | ..................... | 74/89.32 |
| 2011/0056321 | A1 | * | 3/2011 | Sim et al. | .................... | 74/490.04 |
| 2011/0167945 | A1 | * | 7/2011 | Yang et al. | ................. | 74/490.04 |

* cited by examiner

*Primary Examiner* — Justin Krause
(74) *Attorney, Agent, or Firm* — Staas & Halsey LLP (57) ABSTRACT

Disclosed are a robot joint driving apparatus and a robot having the same, capable of minimizing tension of a wire applied to a movable member by installing an idle pulley in a power transmission structure using a ball screw apparatus and the wire. The robot joint driving apparatus includes a reversible drive motor, a pair of movable members performing a linear movement according to rotation of the reversible drive motor, a wire connected to the movable members from both directions of the movable members, an idle pulley rotatably installed at one side of the wire, a joint part rotatably installed at an opposite side of the wire, and an adjustment unit to adjust tension of the wire.

11 Claims, 10 Drawing Sheets

ROBOT JOINT DRIVING APPARATUS AND ROBOT HAVING THE SAME

CROSS-REFERENCE TO RELATED APPLICATIONS

This application claims the benefit of Korean Patent Application No. 10-2008-0135457, filed on Dec. 29, 2008, in the Korean Intellectual Property Office, the disclosure of which is incorporated herein by reference.

BACKGROUND

1. Field

The present invention relates to a robot joint driving apparatus and a robot having the same. More particularly, the present invention relates to a robot joint driving apparatus provided with an improved joint driving structure and a robot having the same.

2. Description of the Related Art

Recently, various robots such as biped walking robots and quadruped walking robots have been developed for household, industrial and military use.

These robots perform various actions in addition to running and walking, which is achieved with joints. The joints can be driven by using a motor and a reduction unit connected to the motor or by using a wire.

The joint driving scheme using the reduction unit is limited as to the arrangement of the driving apparatus, which causes severe noise in operation and results in a low driving efficiency. In particular, the joint driving scheme has poor reverse-drivability, so that the robot-human interaction may not be effectively achieved.

The joint driving scheme using a wire has been recently introduced since the joint driving scheme using the wire can solve the problems occurring in the joint driving scheme using the reduction unit.

As one example of the joint driving scheme using the wire, an actuator having the structure identical to that of muscles of a human is used. In the joint driving scheme using the wire, the wire is wound around a pulley connected to the motor and is pulled such that a joint rotates, thereby operating a link connected to the joint.

SUMMARY

Accordingly, it is an aspect of the present invention to provide a robot joint driving apparatus having a structure to be easily controlled by using a wire, and a robot having the same.

It is another aspect of the present invention to provide a robot joint driving apparatus and a robot having the same, capable of minimizing tension of a wire applied to a movable member by installing an idle pulley in a power transmission structure using a ball screw apparatus and the wire.

Additional aspects and/or advantages of the invention will be set forth in part in the description which follows and, in part, will be apparent from the description, or may be learned by practice of the invention.

The foregoing and/or other aspects of the present invention are achieved by providing a joint driving apparatus, which includes a reversible drive motor, a pair of movable members performing a linear movement according to a rotation of the reversible drive motor, a wire connected to the movable members from both directions of the movable members, an idle pulley rotatably installed at a first side of the wire, a joint part rotatably installed at a second side of the wire, opposite the first side, and an adjustment unit adjusting a tension of the wire.

The joint driving apparatus further includes a pair of ball screw parts to which the movable members are screwed, respectively.

The joint driving apparatus further includes a ball screw part, to which one of the movable members is screwed, and a guide bar, which is disposed in parallel to the ball screw part such that the remaining movable member is coupled to the guide bar.

The joint driving apparatus further includes a coupling member which connects the movable members to each other such that the movable members linearly move in a same direction.

A load cell is installed on the idle pulley to measure tension of the wire.

The ball screw parts are engaged with the reversible drive motor to rotate according to an operation of the reversible drive motor.

The guide part allows the movable member to linearly and slidably move. The coupling member is formed with a wire through hole, into which the wire is inserted, and a wire fastening hole fixing the wire using a connection pin.

The idle pulley is coupled through two balls and two adjustment bolts such that the idle pulley moves up and down according to rotation of the adjustment unit.

The foregoing and/or other aspects of the present invention are also achieved by providing a joint driving apparatus which includes a driver including a drive motor and a gear part connected to the drive motor, a ball screw part engaged with the gear part, a movable member provided on the ball screw part to perform a linear movement as the drive motor is driven, a wire fixed to the movable member, in which at least one strand of the wire is connected to the movable member from both sides of the movable member in parallel such that the wire moves according to a movement of the movable member, an idle pulley connected to a first side of the wire, a joint part connected to a second side of the wire, opposite the first side, and operating upon a movement of the wire in combination with the idle pulley, and an adjustment unit adjusting a tension of the wire.

The idle pulley is installed using a connection member in such a manner that the idle pulley applies tension to the wire. The wire surrounds one side of an outer surface of the joint part such that the wire maintains a predetermined tension.

The joint driving apparatus further includes a guide bar which allows the movable member to perform a linear movement.

The foregoing and/or other aspects of the present invention are also achieved by providing a joint driving apparatus which includes a reversible drive motor, a first ball screw apparatus coupled to the reversible drive motor and including a first movable member that performs a linear movement as the reversible drive motor is driven in a first direction, a second ball screw apparatus coupled to the reversible drive motor and including a second movable member that performs a linear movement in a same direction as the first movable member when the reversible drive motor is driven in the first direction, a wire connected to the first and second movable members from both directions of the first and second movable members, an idle pulley surrounded by one side of the wire to adjust a tension of the wire, a joint part coupled to an opposite side of the wire such that the joint part rotates upon movement of the wire and thus the joint part rotates according to operation of the reversible drive motor, and an adjustment unit adjusting the tension of the wire.

The foregoing and/or other aspects of the present invention are also achieved by providing a robot which includes at least one joint part, and at least one joint driving apparatus to drive the joint part, wherein the joint driving apparatus includes a drive motor, a pair of movable members performing a linear movement according to operation of the drive motor, a wire connected to the movable members from both directions of the movable members, an idle pulley adjusting a tension of the wire, a joint part rotated by the wire, and an adjustment unit adjusting the tension of the wire.

The robot further includes a pair of ball screw parts, wherein the movable members are screwed to the ball screw parts, respectively. The robot further includes a ball screw part, to which one of the movable members is screwed, and a guide bar, which is disposed in parallel with the ball screw part such that the remaining movable member is coupled to the guide bar. The robot further includes a coupling member which connects the movable members to each other such that the movable members perform a linear movement in a same direction.

A load cell is installed on the idle pulley to measure the tension of the wire.

The ball screw parts are engaged with the drive motor to rotate according to operation of the drive motor.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Although the following description will be made in relation to a humanoid robot, the present invention is applicable for various types of robots.

Figure 1:
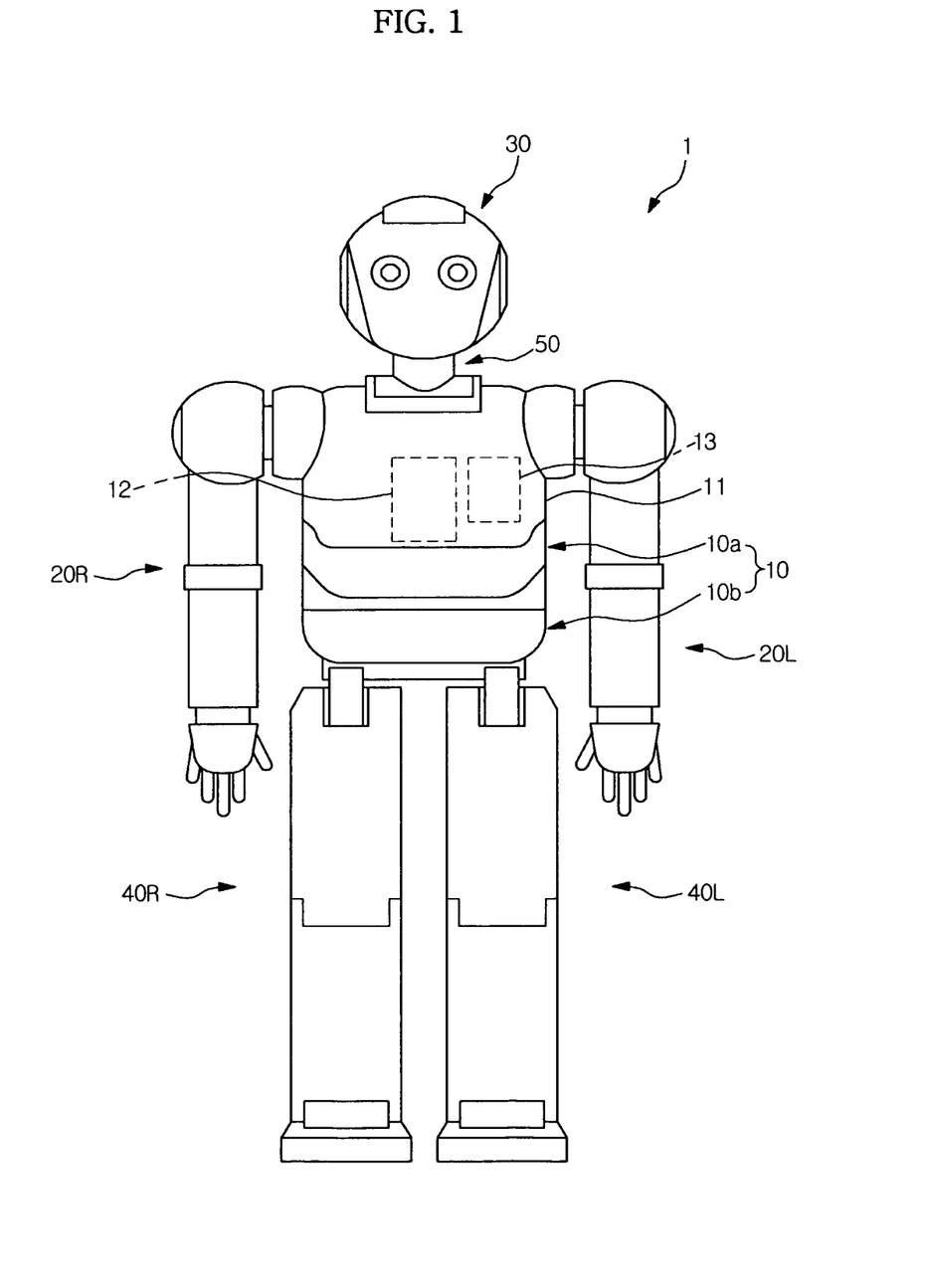
FIG. 1 is a view showing an external appearance of a humanoid robot according to the first embodiment of the present invention.
Figure 2:
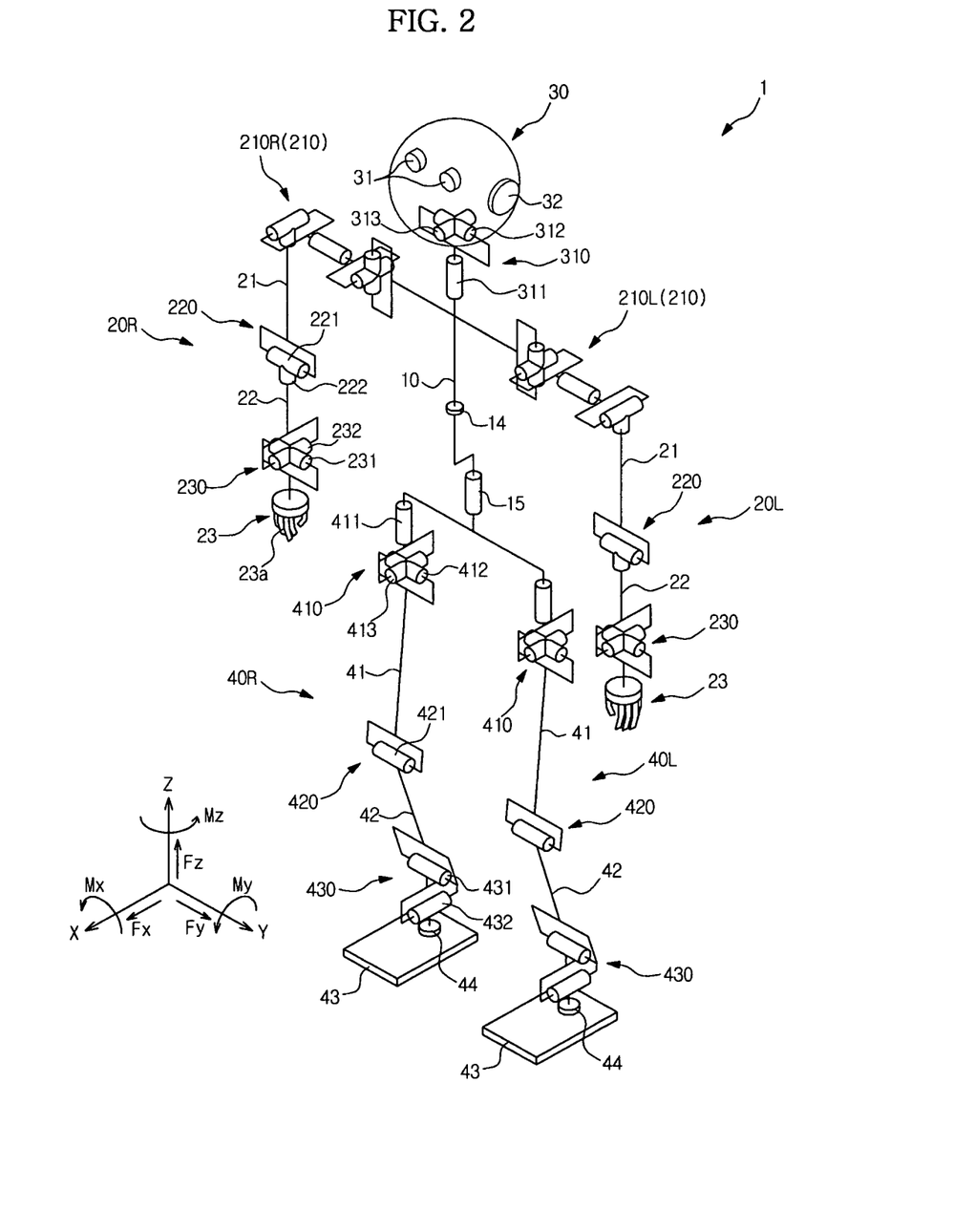
FIG. 2 is a view schematically showing a structure of the humanoid robot shown in FIG. 1.

FIG. 1 is a view showing an external appearance of a humanoid robot according to the first embodiment of the present invention, and FIG. 2 is a view schematically showing a structure of the humanoid robot shown in FIG. 1.

As shown in FIGS. 1 and 2, a humanoid robot (hereinafter, simply referred to as a 'robot') 1 includes a central body 10, arms 20R and 20L connected to both upper sides of the central body 10, a head 30 connected to an upper end of the central body 10, and legs 40R and 40L connected to both lower sides of the central body 10. The arms 20R and 20L are connected to the central body 10 through shoulder joint assemblies 210R and 210L, and the head 30 is connected to the central body 10 through a neck 50. Reference numerals "R" and "L" represent a right side and a left side, respectively.

The interior of the central body 10 is protected by a cover 11. A control unit 12, a battery 13 and an inclination sensor 14 (see, FIG. 2) are installed in the central body 10. The inclination sensor 14 detects an inclination angle and an angular velocity of the central body 10 with respect to a vertical axis.

The central body 10 is divided into a chest part 10a and a waist part 10b. A joint 15 is installed between the chest part 10a and the waist part 10b such that the chest part 10a is rotatable relative to the waist part 10b. In FIG. 2, the central body 10 is briefly shown as a link.

The arms 20R and 20L are provided with upper arm links 21, lower arm links 22 and hands 23. The upper arm link 21 is connected to the central body 10 through the shoulder joint assembly 210. The upper arm link 21 and the lower arm link 22 are connected to each other through an elbow joint part 220, and the lower arm link 22 is connected to the hand 23 through a wrist joint part 230.

The elbow joint part 220 includes a pitch-direction rotation joint 221 and a yaw-direction rotation joint 222 and thus has two degrees of freedom. The wrist joint part 230 includes a pitch-direction rotation joint 231 and a roll-direction rotation joint 232 and thus has two degrees of freedom.

Five fingers 23a are installed on the hand 23. The fingers 23a are provided with a plurality of joints (not shown) driven by a motor. The finger 23a performs various actions, such as grabbing an object and pointing a specific direction in combination with the movement of the arms 20R and 20L.

The shoulder joint assemblies 210R and 210L are installed at both sides of the central body 10 to connect the arms 20R and 20L to the central body 10. The shoulder joint assemblies 210R and 210L are disposed between the central body 10 and the arms 20R and 20L of the robot 1 to move the arms 20R and 20L.

A camera 31 serving as an eye of the robot 1 and a microphone 32 serving as an ear of the robot 1 are installed on the head 30.

The head 30 is connected to the central body 10 through a neck joint part 310. The neck joint part 310 includes a yaw-direction rotation joint 311, a pitch-direction rotation joint 312 and a roll-direction rotation joint 313 and thus has three degrees of freedom.

Motors (not shown) rotating the head 30 are connected to the rotation joints 311, 312 and 313 of the neck joint part 310. The control unit 12 controls the motors to drive the rotation joints 311, 312 and 313 at a predetermined angle, thereby moving the head 30 in a desired direction.

The legs 40R and 40L are provided with a thigh link 41, a lower leg link 42 and a foot 43. The thigh link 41 is connected to the central body 10 through a thigh joint part 410. The thigh link 41 and the lower leg link 42 are connected to each other through the knee joint part 420, and the lower leg link 42 is connected to the foot 43 through an ankle joint part 430.

The thigh joint part 410 has three degrees of freedom. In detail, the thigh joint part 410 includes a yaw-direction rotation joint 411 for rotation about a Z axis, a pitch-direction rotation joint 412 for rotation about a Y axis, and a roll-direction rotation joint 413 for rotation about an X axis.

The knee joint part 420 includes a pitch-direction rotation joint 421 and has one degree of freedom. The ankle joint part 430 includes a pitch-direction rotation joint 431 and a roll-direction rotation joint 432 and thus has two degrees of freedom.

As described above, the three joint parts of the legs 40R and 40L are provided with six rotation joints, so twelve joints are provided in the legs. Although not shown, motors driving the rotation joints are installed on the legs 40R and 40L. The control unit 12 controls the motors provided on the legs 40R and 40L such that the legs 40R and 40L achieve various actions such as walking of the robot 1.

Meanwhile, a multi-axis force and torque sensor 44 is installed between the foot 43 and the ankle joint part 430 in the legs 40R and 40L. The multi-axis force and torque sensor 44 measures three directional components of force Fx, Fy and Fz and three directional components of moment Mx, My and Mz transferred from the foot 43, thereby detecting whether the foot 43 is grounded and detecting the load applied to the foot 32.

Such a robot 1 is provided with a joint driving apparatus 500 driving the joints. Although the joint driving apparatus can be applied to various joints of the arm, the leg and the neck, the following description will be made in relation to the joint driving apparatus 500 applied to the knee joint part and the ankle joint part of the leg.

Figure 3:
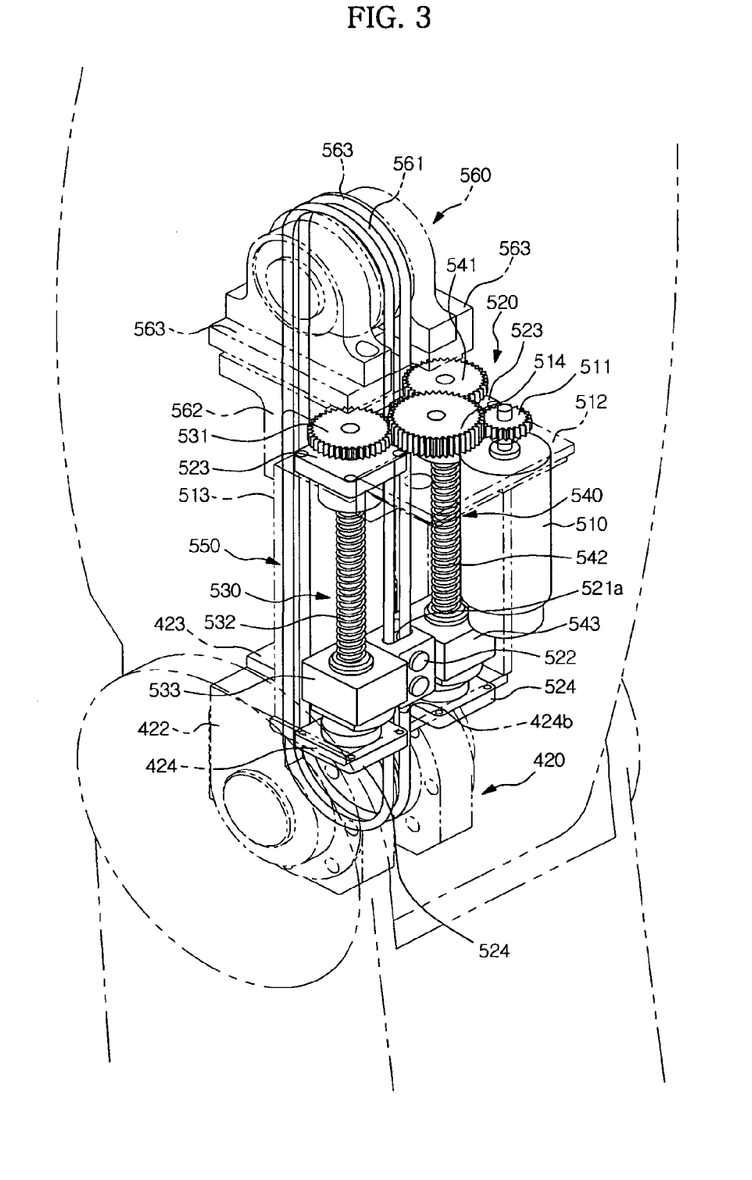
FIG. 3 is a perspective view showing a knee joint driving apparatus according to the first embodiment of the present invention.
Figure 4:
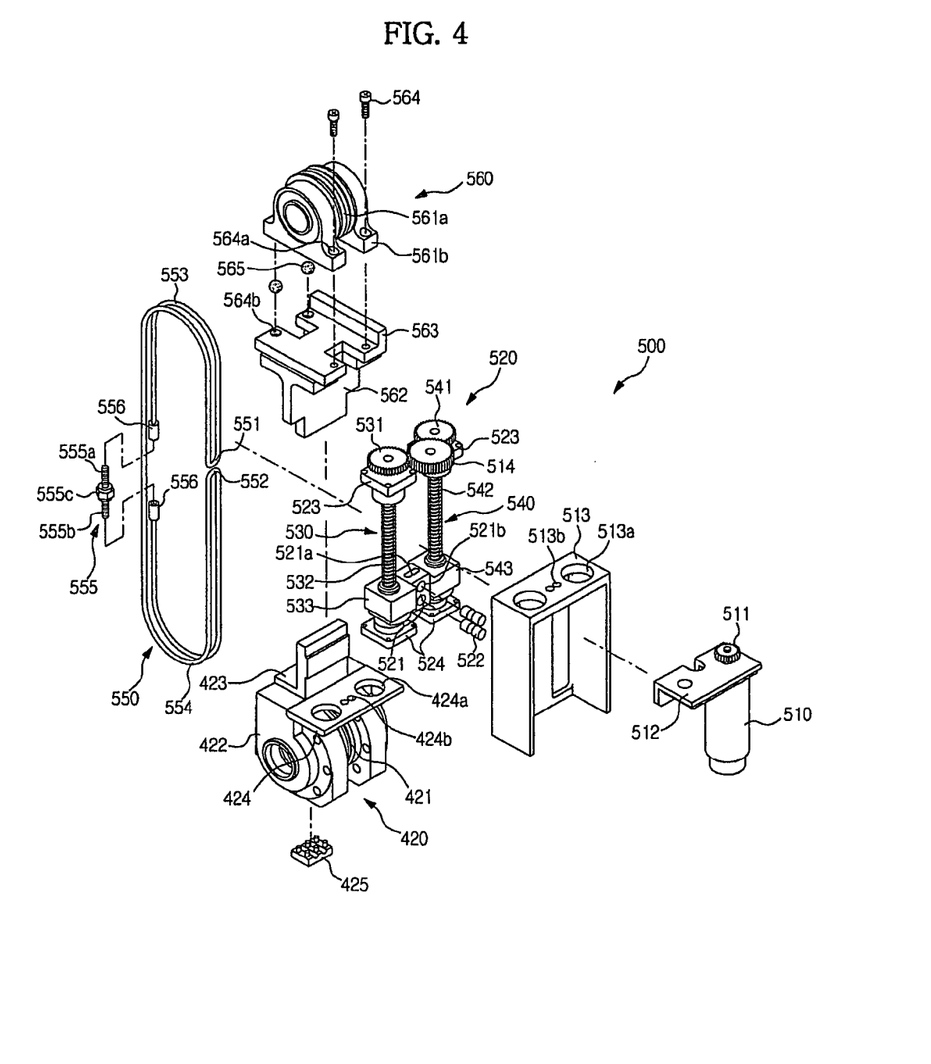
FIG. 4 is an exploded perspective view showing the knee joint driving apparatus shown in FIG. 3.

FIG. 3 is a perspective view showing a knee joint driving apparatus according to the first embodiment of the present invention, and FIG. 4 is an exploded perspective view showing the knee joint driving apparatus shown in FIG. 3.

As shown in FIGS. 3 and 4, the joint driving apparatus 500 according to the first embodiment of the present invention includes a reversible drive motor 510, a pair of ball screw apparatuses 530 and 540 provided with a pair of movable members 533 and 543, which are coupled to the drive motor 510 to perform a linear movement according to operation of the drive motor 510, a wire 550 connected to the movable members 533 and 543 from both sides of the movable members 533 and 543, an idle pulley 561 rotatably installed at one end of the wire 550, and the knee joint part 420 rotatably installed at the opposite end of the wire 550.

The drive motor 510 can be driven in the forward/backward directions and is provided with a motor gear 511. The drive motor 510 is installed on a motor bracket 512 and is coupled to a frame 513. A driving gear 514 is engaged with the motor gear 511 to receive driving force of the drive motor 510.

The ball screw apparatus 520 is provided with the movable members 533 and 543 which are engaged with the driving gear 514 to linearly move up and down when the drive motor 510 is driven forward or backward.

The ball screw apparatus 520 according to the first embodiment of the present invention includes a first ball screw apparatus 530, which is engaged with the driving gear 514 and has a first movable member 533 performing an up/down linear movement upon the operation of the drive motor 510, and a second ball screw apparatus 540, which is engaged with the driving gear 514 and has a second movable member 543 performing an up/down linear movement similar to the first movable member 533 upon the operation of the drive motor 510.

The first ball screw apparatus 530 includes a first gear part 531 engaged with the driving gear 514, a first ball screw part 532, which is integrally formed with the first gear part 531 and is provided at an outer surface thereof with a screw part, and the first movable member 533 moving up and down along the first ball screw part 532 upon the rotation of the first ball screw part 532.

The second ball screw apparatus 540 includes a second gear part 541 engaged with the driven gear 514, a second ball screw part 542, which is integrally formed with the second gear part 541 and is provided at an outer surface thereof with a screw part, and the second movable member 543 moving up and down along the second ball screw part 542 upon the second ball screw part 542.

The first and second movable members 533 and 543 are provided in the form of a substantially hexahedral shape. The first movable member 533 is screwed to the first ball screw part 532 of the first ball screw apparatus 530 and the second movable member 543 is screwed to the second ball screw part 542 of the second ball screw apparatus 540.

A coupling member 521 is provided between the first movable member 533 and the second movable member 543 to couple the first and second movable members 533 and 543 to each other. The first movable member 533 and the second movable member 543 linearly move in the same direction in combination with each other. When the drive motor 510 is operated, the first and second movable members 533 and 543 perform a linear movement up and down without performing rotation.

A wire through hole 521*a* is formed through an upper side and a lower side of the coupling member 521 to couple the wire 550. In addition, a wire fastening hole 521*b* is formed through the coupling member 521 to connect the wire 550, which is coupled through the wire through hole 521*a*, to the movable members 533 and 543. The wire 550 inserted into the wire through hole 521*a* is fixed to the coupling member 521 by a connection pin 522 fitted into the wire fastening hole 521*b*.

The first and second movable members 533 and 543 connected to the coupling member 521 linearly move in the same direction. To this end, both first and second movable members 533 and 543 are provided in the form of a right-hand screw part or in the form of a left-hand screw part. Reference numeral 523, which is not described above, refers to an upper flange, which is coupled to a frame hole 513*a* to cover the first and second ball screw apparatuses 530 and 540, and reference numeral 513*b*, which is not described above, refers to a hole which allows the wire 550 to pass through the frame 513.

The wire 550 is connected to the idle pulley 561 and the knee joint part 420 while maintaining a predetermined tension such that the knee joint part 420 is rotated through driving force of the drive motor 510. The wire 550 includes steel and is wound around the idle pulley 561 having a disk shape, and the knee joint part 420.

The wire 550 according to the first embodiment of the present invention has an adjustment unit 555, which is provided at one end thereof with a right-hand screw part 555*a* and at the opposite end thereof with a left-hand screw part 555*b*. A female screw 556 is formed at both ends of the wire 550 opposite the adjustment unit 555 to accommodate the right-hand screw part 555*a* and the left-hand screw part 555*b*. As the right-hand screw part 555*a* and the left-hand screw part 555*b* of the adjustment unit 555 are rotated clockwise or counterclockwise by an adjustment part 555*c*, a relative length of the wire 550 between the knee joint part 420 and the idle pulley 561 varies, so that the tension of the wire is adjusted.

The right-hand screw part 555*a* and the left-hand screw part 555*b* of the wire 550 are coupled through the adjustment unit 555 and thus the wire is assembled in such a manner that two strands of the wire 550 are disposed in parallel with each other. After the assembling work for the wire 550 has been finished, the wire 550 surrounds an upper outer portion of the idle pulley 561 and a lower outer portion of the knee joint part 420. That is, one end 554 of the wire 550 is wound around the knee joint part 420 such that the knee joint part 420 receives driving force of the drive motor 510, and an opposite end 553 of the wire 550 is wound around the idle pulley 561, which is separately installed to adjust the tension of the wire 550.

Figure 5:
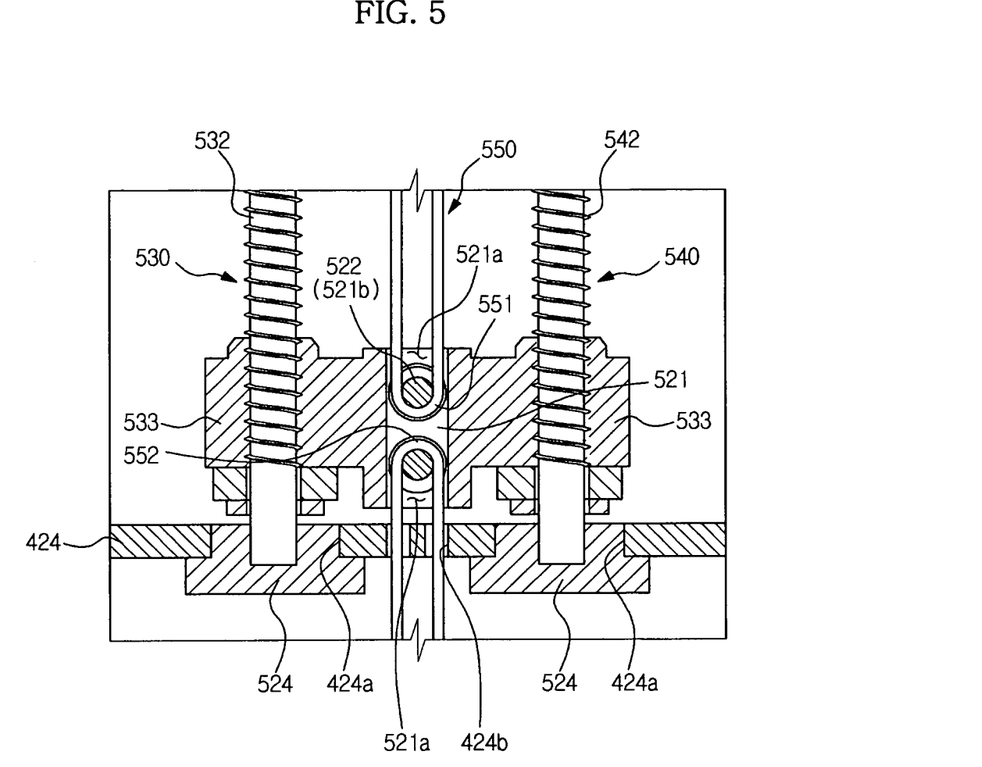
FIG. 5 is a sectional view showing a coupling relation among a first movable member, a second movable member and a wire shown in FIG. 3.

FIG. 5 is a sectional view showing a coupling relationship between a first movable member, a second movable member and a wire. As shown in FIG. 5, the wire 550 having the two strands has a first end 551 and a second end 552 connected to the coupling member 521. The first end 551 of the wire 550 is inserted into the wire through hole 521a formed at the upper side of the coupling member 521 and then is coupled to the wire fastening hole 521b formed at an upper portion of the coupling member 521 through the connection pin 522, so that the first end 551 of the wire 550 is fixed to the coupling member 521. The second end 552 of the wire 550 is inserted into the wire through hole 521a formed at the lower side of the coupling member 521 and then is coupled to the wire fastening hole 521b formed at a lower portion of the coupling member 521 through the connection pin 522, so that the second end 552 is fixed to the coupling member 521. The movable members 533 and 543 are connected to the wire 550 from both directions of the wire 550, so the wire 550 does not pull the movable members 533 and 543 in one direction, so that load of the drive motor 510 is prevented from being increased due to increase of the repulsive force between the movable members 533 and 543 and the ball screw parts 532 and 543.

Figure 6A:
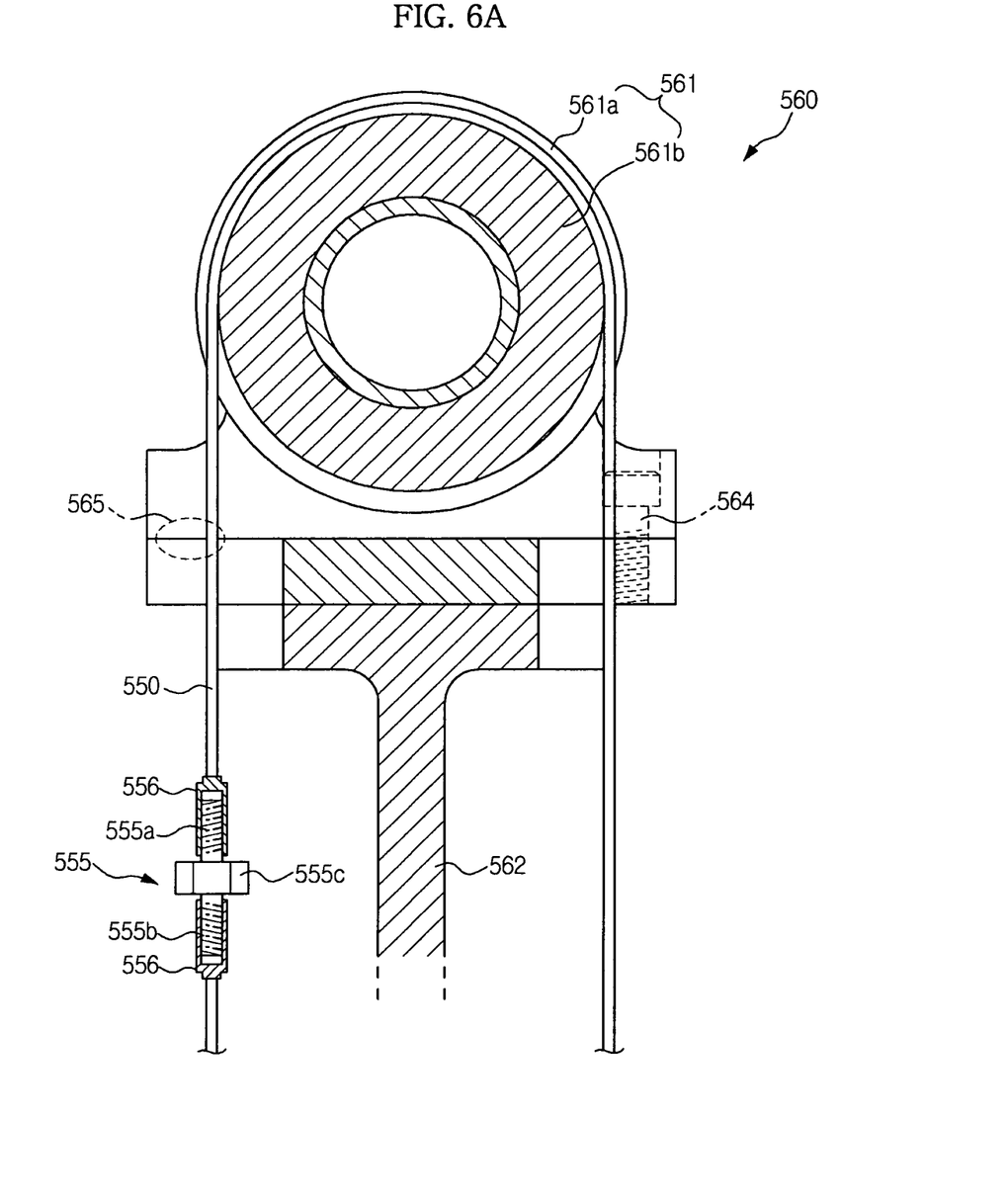
FIGS. 6A and 6B are views showing an idle pulley assembly shown in FIG. 3.
Figure 6B:
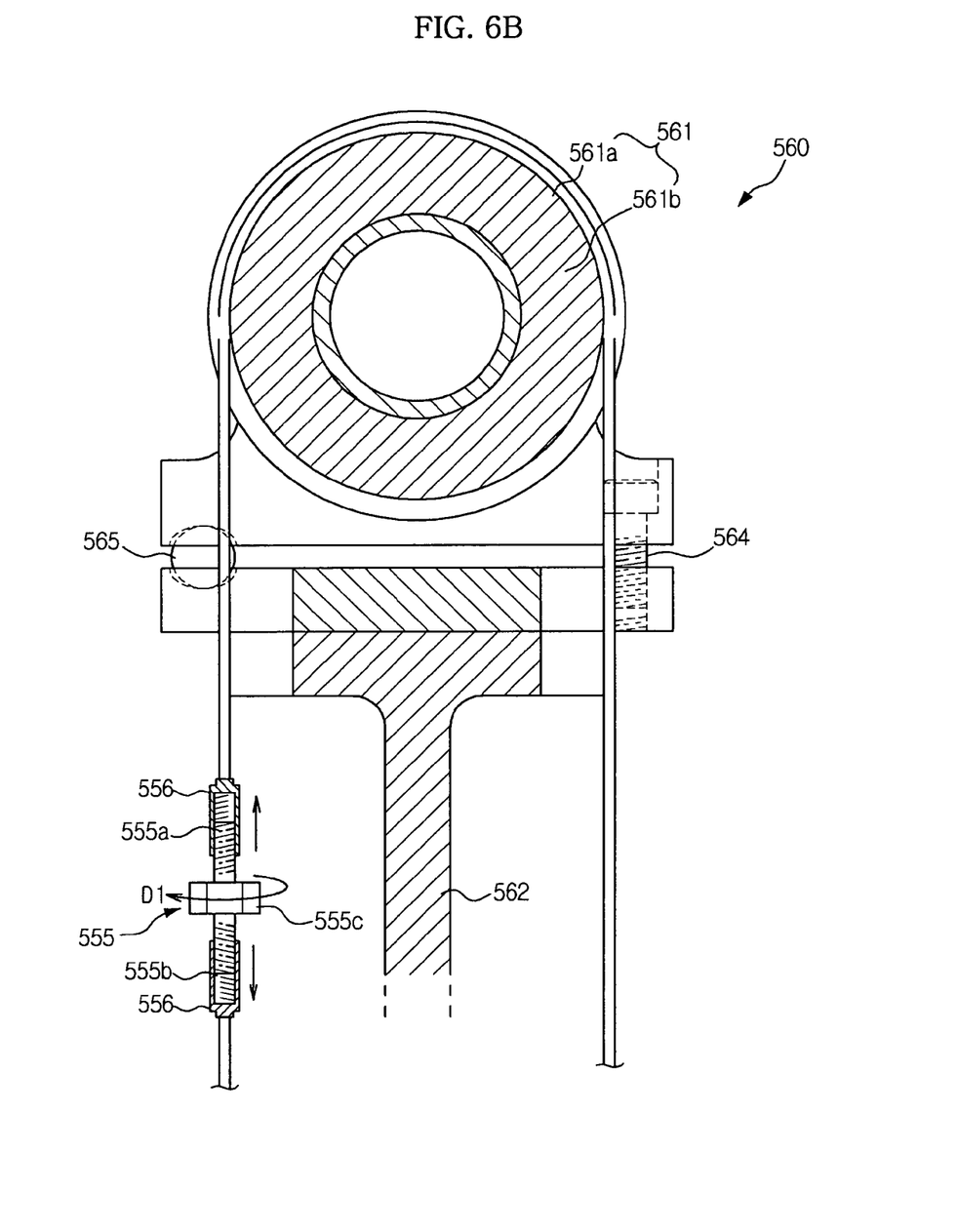

FIGS. 6A and 6B are views showing an idle pulley assembly. As shown in FIGS. 3 to 6, an idle pulley assembly 560 includes the idle pulley 561 rotating upon the movement of the wire 550 and a connection plate 562 coupling the idle pulley 561 to the frame 513.

The idle pulley 561 includes a rotation part 561a wound around the wire 550 and a cover 561b, which is coupled to the rotation part 561a to surround a portion of the rotation part 561a. A linking plate 563 is provided between the cover 561b and the connection plate 562.

The idle pulley 561 is formed at a circumference thereof with a wire groove having a predetermined depth and the wire groove is provided at an outer surface thereof with a thread. The idle pulley 561 has two wire grooves such that the two strands of the wire 550, which are disposed in parallel to each other, can be coupled with the two wire grooves. Although the idle pulley 561 according to the first embodiment includes two wire grooves, the embodiments of the present invention are not limited thereto. According to another embodiment, the number of the wire grooves may vary depending on the length of the wire 550 and the size of the idle pulley 561 to adjust the rotation of the knee joint part 420.

Connection members 564 and 565 are installed in a connection groove 564a formed at one side of the cover 561b such that the idle pulley 561 moves to apply tension to the wire 550. The connection members 564 and 565 include two adjustment bolts 564 and two balls 565 and are coupled to the connection groove 564a. That is, the two adjustment bolts 564 are coupled to the connection groove 564a and the two balls 565 are coupled to a connection groove 564b. Accordingly, the idle pulley 561 is finely transferred by the adjustment unit 555 of the wire 550, thereby keeping the tension of the wire 550 in a predetermined level.

In other words, as shown in FIGS. 6A and 6B, in a state that the adjustment bolt 564 is connected to the connection groove 564a provided at an upper part of the cover 561b, if the adjustment unit 555 of the wire 550 is rotated in a first direction D1, the ball 565 connected to a front end of the cover 561b interacts with the adjustment bolt 564 to move up the idle pulley 561, so that the tension of the wire 550 is tightly maintained.

However, according to another embodiment of the present invention, the connection members may include only the adjustment bolt (not shown) having tension such that the tension of the wire 550 is adjusted by moving the idle pulley 561. That is, the connection members according to another embodiment of the present invention can be provided in various shapes and various positions, and those skilled in the art will appreciate that various modifications are possible, without departing from the scope and spirit of the invention as disclosed in the accompanying claims.

The knee joint part 420 is rotated by the wire 560 in combination with the idle pulley 561. The knee joint part 420 includes the pitch rotation part 421 rotating in combination with the wire 550, a joint cover 422 surrounding the outer surface of the rotation joint part 421 and a joint connection plate 423 provided at an upper side of the joint cover 422.

The rotation joint part 421 is formed with two wire grooves around which the two strands of the wire 550 are wound in parallel with each other.

The joint connection plate 423 is vertically formed at the upper side of the joint cover 422 and is coupled to the frame 513. A joint support plate 424 is provided lengthwise along the upper side of the joint cover 422 at one side of the joint connection plate 423. A coupling hole 424a is formed in both ends of the joint support plate 424 such that a lower flange 524 covering the first and second ball screw parts 532 and 542 is coupled to the coupling hole 424a. A wire hole 424b is formed between the two coupling holes 424a such that the two strands of the wire 550 wound around the rotation joint part 421 pass through the wire hole 424b.

Reference numeral 425, which is not described above, refers to a clamp which fixes the wire 550 to the rotation joint part 421 to prevent the wire 550 from moving relative to the rotation joint part 421.

Hereinafter, the operation of the joint driving apparatus according to the first embodiment of the present invention will be described with reference to FIG. 7.

Figure 7:
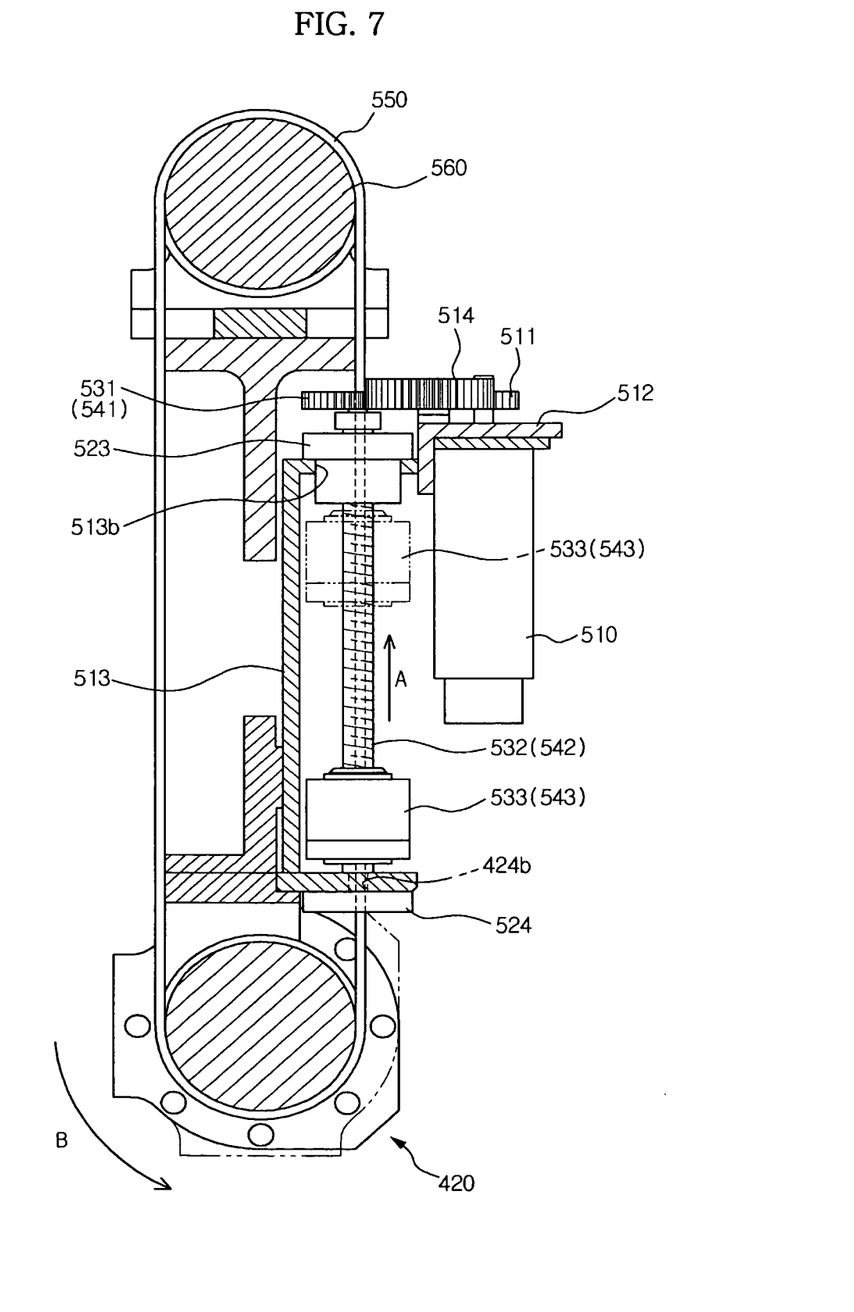
FIG. 7 is a view showing an operation of the knee joint driving apparatus according to the first embodiment of the present invention.

As shown in FIG. 7, if the drive motor 510 is driven forward, the first movable member 533 moves along the first ball screw part 532 in an A direction, and simultaneously, the second movable member 543 connected to the first movable member 533 through the coupling member 521 moves along the second ball screw part 542 in the A direction. Since the wire 550 fixed to the coupling member performs an up/down linear movement according to the movement of the first and second movable members 533 and 543, the knee joint part 420 rotates in a B direction.

In addition, if the drive motor 510 is driven backward, the first and second movable members 533 and 543 move in an opposite direction, so the wire 550 coupled to the first and second movable members 533 and 543 moves in the opposite direction. Accordingly, the idle pulley 561 and the knee joint part 420 rotate in the opposite direction.

As described above, the joint driving apparatus according to the present invention can stably rotate the knee joint part coupled to the wire by using a single drive motor. In addition, tension is applied to the wire in a state that the idle pulley is installed on the joint driving apparatus, so the tension of the wire, which is applied to the moveable members, is minimized.

Hereinafter, a joint driving apparatus according to the second embodiment of the present invention and a robot having the same will be described.

Figure 8:
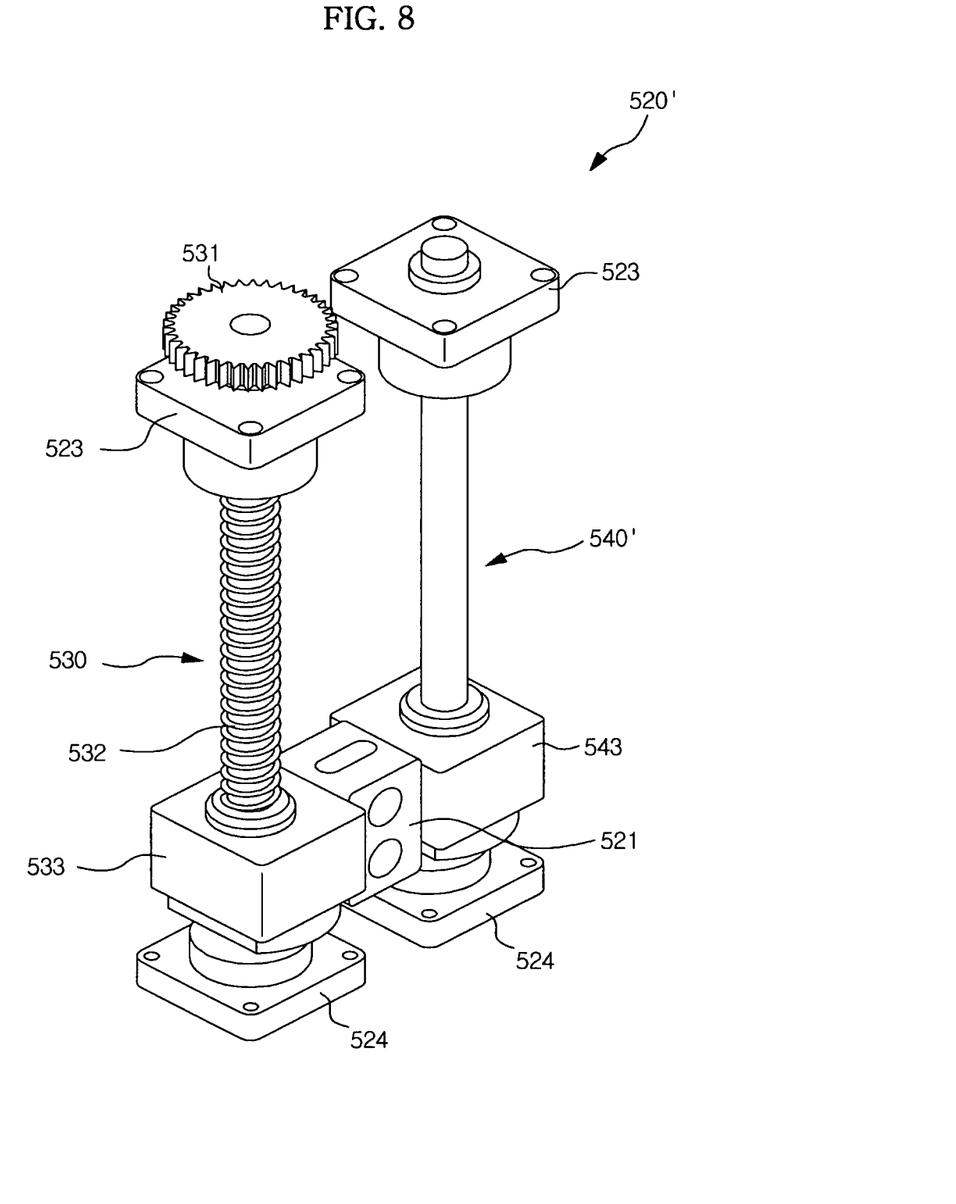
FIG. 8 is a perspective view showing a knee joint driving apparatus according to the second embodiment of the present invention.

FIG. 8 is a perspective view showing a part of the knee joint driving apparatus according to the second embodiment of the present invention. In the joint driving apparatus according to the second embodiment, the same reference numerals will be assigned to the same elements of the first embodiment and detailed description thereof will be omitted in order to redundancy.

A joint driving apparatus 500' according to the second embodiment of the present invention includes the reversible drive motor 510, a pair of movable members 533 and 543, which perform a linear movement according to rotation of the drive motor 510, the wire 550 connected to the movable members 533 and 543, an idle pulley assembly 560' rotatably installed at one end of the wire 550, the knee joint part 420 rotatably installed at the opposite end of the wire 550, a load cell 570 detecting tension of the wire 550, the control unit 580, which is electrically connected to the load cell 570 to receive an output from the load cell 570 and generates a signal by comparing the output with a reference value, and the adjustment unit 555.

Therefore, if the wire 550 is unfastened, the load cell 570 installed on the idle pulley assembly 560' measures the tension of the wire 550 and the control unit 580 outputs the signal to the outside, so that a user can adjust the tension of the wire 550 between the idle pulley assembly 560' and the knee joint part 420 by using the adjustment unit 555.

Hereinafter, a joint driving apparatus according to the third embodiment of the present invention and a robot having the same will be described.

Figure 9:
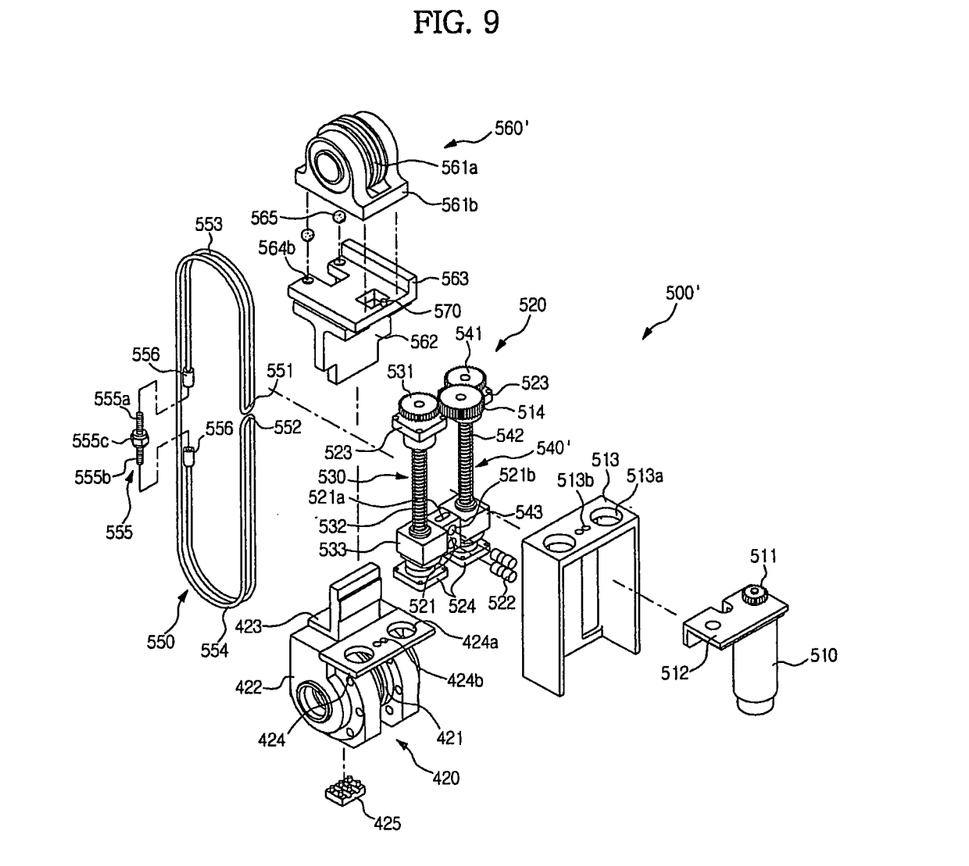
FIG. 9 is a perspective view showing a part of a knee joint driving apparatus according to the third embodiment of the present invention.

FIG. 9 is a perspective view showing a part of a knee driving apparatus according to the third embodiment of the present invention. In the joint driving apparatus according to the third embodiment, the same reference numerals will be assigned to the same elements of the first embodiment and detailed description thereof will be omitted in order to avoid redundancy.

As shown in FIG. 9, a ball screw apparatus 520' according to the third embodiment of the present invention includes a guide bar 540' disposed in parallel to the first ball screw part 530.

The guide part 540' is disposed in parallel to the first ball screw part 530 such that driving force is not transferred to the second movable member 543 and the first and second movable members 533 and 543 perform an up/down linear movement without rotation. That is, the guide bar 540' allows the first and second movable members 533 and 543 to perform a sliding movement. As a result, when the drive motor 510 operates, the first and second movable members 533 and 543 perform an up/down linear movement without rotation.

According to the joint driving apparatus of the embodiments of the present invention and the robot having the same, the joint can be easily controlled by using the wire. In addition, tension of the wire is applied in a state that the idle pulley is installed, so that the tension of the wire applied to the movable members can be minimized.

Although few embodiments of the present invention have been shown and described, it would be appreciated by those skilled in the art that changes may be made in these embodiments without departing from the principles and sprit of the invention, the scope of which is defined in the claims and their equivalents.

What is claimed is:

1. A robot joint driving apparatus comprising:
   a reversible drive motor;
   a pair of ball screw parts engaged with the reversible drive motor;
   a pair of movable members engaged with the pair of ball screw parts and performing a linear movement according to a rotation of the reversible drive motor;
   a wire connected to the movable members from both directions of the movable members;
   an idle pulley rotatably installed at a first side of the wire;
   a joint part rotatably installed at a second side of the wire, opposite the first side;
   an adjustment unit adjusting a tension of the wire;
   a load cell installed on the idle pulley to measure the tension of the wire; and
   a pair of balls and adjustment bolts, wherein the idle pulley is coupled through the two balls and the two adjustment bolts such that the idle pulley moves linearly according to rotation of the adjustment unit.

2. The robot joint driving apparatus of claim 1, further comprising a ball screw part, to which one of the movable members is screwed, and a guide bar, which is disposed in parallel with the ball screw part such that the other of the remaining movable members is coupled to the guide bar.

3. The robot joint driving apparatus of claim 2, wherein the guide part allows the movable member to linearly and slidably move.

4. The robot joint driving apparatus of claim 1, further comprising a coupling member which connects the movable members to each other such that the movable members linearly move in a same direction.

5. The robot joint driving apparatus of claim 4, further comprising a connection pin wherein the coupling member is formed with a wire through hole, into which the wire is inserted, and a wire fastening hole to fix the wire using the connection pin.

6. The robot joint driving apparatus of claim 1, wherein the ball screw parts are engaged with the reversible drive motor to rotate according to an operation of the reversible drive motor.

7. A joint driving apparatus comprising:
   a driver including a drive motor and a gear part connected to the drive motor;
   a pair of ball screw parts engaged with the gear part;
   a pair of movable members provided on the pair of ball screw parts to perform a linear movement as the drive motor is driven;
   a wire fixed to the pair of movable members, in which at least one strand of the wire is connected to each movable member from both sides of the each movable member in parallel such that the wire moves according to a movement of the each movable member;
   an idle pulley connected to a first side of the wire;
   a joint part connected to a second side of the wire, opposite the first side, and operating upon a movement of the wire in combination with the idle pulley; and
   an adjustment unit adjusting a tension of the wire;
   a load cell installed on the idle pulley to measure the tension of the wire; and
   a pair of balls and adjustment bolts, wherein the idle pulley is coupled through the two balls and the two adjustment bolts such that the idle pulley moves linearly according to rotation of the adjustment unit.

8. The joint driving apparatus of claim 7, further comprising a connection member, wherein the idle pulley is installed using the connection member so that the idle pulley applies the tension to the wire.

9. The joint driving apparatus of claim 7, wherein the wire surrounds one side of an outer surface of the joint part such that the wire maintains a predetermined tension.

10. The joint driving apparatus of claim 7, further comprising a guide bar which allows the movable member to perform a linear movement.

11. A robot joint driving apparatus comprising:
a reversible drive motor;
a first ball screw apparatus coupled to the reversible drive motor and including a first movable member that performs a linear movement as the reversible drive motor is driven in a first direction;
a second ball screw apparatus coupled to the reversible drive motor and including a second movable member that performs a linear movement in a same direction as the first movable member when the reversible drive motor is driven in the first direction;
a wire connected to the first and second movable members from both directions of the first and second movable members;
an idle pulley surrounded by one side of the wire to adjust a tension of the wire;
a joint part coupled to an opposite side of the wire such that the joint part rotates upon movement of the wire and according to operation of the reversible drive motor; and
an adjustment unit adjusting a tension of the wire;
a load cell installed on the idle pulley to measure the tension of the wire; and
a pair of balls and adjustment bolts, wherein the idle pulley is coupled through the two balls and the two adjustment bolts such that the idle pulley moves linearly according to rotation of the adjustment unit.

* * * * *